United States Patent
Lyou et al.

(10) Patent No.: US 8,275,869 B2
(45) Date of Patent: Sep. 25, 2012

(54) RE-SYNCHRONIZING DATA BETWEEN NETWORK ELEMENTS AND NETWORK MANAGEMENT SYSTEM USING PARTIAL NODE DISCOVERY

(75) Inventors: Desyang L. Lyou, Pleasanton, CA (US); Christina S. Wu, Saratoga, CA (US)

(73) Assignee: Tellabs Operations, Inc., Naperville, IL (US)

( * ) Notice: Subject to any disclaimer, the term of this patent is extended or adjusted under 35 U.S.C. 154(b) by 410 days.

(21) Appl. No.: 12/535,876

(22) Filed: Aug. 5, 2009

(65) Prior Publication Data
US 2011/0035480 A1 Feb. 10, 2011

(51) Int. Cl.
*G06F 15/173* (2006.01)
(52) U.S. Cl. ........ 709/223; 709/248
(58) Field of Classification Search .......... 709/223, 709/248
See application file for complete search history.

(56) References Cited

U.S. PATENT DOCUMENTS

| | | | |
|---|---|---|---|
| 6,041,350 A * | 3/2000 | Takimoto | 709/223 |
| 6,438,563 B1 * | 8/2002 | Kawagoe | 1/1 |
| 6,564,341 B1 * | 5/2003 | Sundaram et al. | 714/43 |
| 7,340,502 B2 * | 3/2008 | Richardson et al. | 709/204 |
| 2007/0150620 A1 * | 6/2007 | Hand et al. | 709/248 |
| 2011/0213869 A1 * | 9/2011 | Korsunsky et al. | 709/223 |

* cited by examiner

*Primary Examiner* — Abdullahi Salad
(74) *Attorney, Agent, or Firm* — J W Law Group; James M. Wu

(57) ABSTRACT

An apparatus and method for improving network efficiency for data transfer utilizing partial node discovery a during system recovery are disclosed. Upon retrieving a saved last sequence number associated with a network element ("NE") from a database in a network management system ("NMS"), a process of the partial node discovery obtains a current last sequence number associated with the NE from the NE. After identifying missing sequence numbers associated with the NE, sequence events associated with the NE in the database are updated in accordance with the missing sequence numbers.

19 Claims, 5 Drawing Sheets

RE-SYNCHRONIZING DATA BETWEEN NETWORK ELEMENTS AND NETWORK MANAGEMENT SYSTEM USING PARTIAL NODE DISCOVERY

FIELD

The exemplary embodiment(s) of the present invention relates to network systems. More specifically, the exemplary embodiment(s) of the present invention relates to information transfer between network device and management system.

BACKGROUND

A high-speed network environment typically includes network devices such as routers and switches used for facilitating delivery of information packets and/or data traffic from source devices to destination devices via communication networks such as IP and/or packet-based networks. Information pertaining to the transfer of data packet(s) and/or frame(s) through the network(s) is usually embedded within the packet and/or frame itself. Each packet, for instance, traveling through multiple nodes via one or more communication networks such as Internet and/or Ethernet can typically be handled independently from other packets in a packet stream or traffic. Each node which may include routing, switching, and/or bridging engines processes incoming packet(s) or frame(s) and determines where the packet(s) or frame(s) should be forwarded.

A typical modern communications network usually includes various network devices such as network elements ("NEs") as well as Network Management systems ("NMSs"). An NE, for instance, is a managed logical entity including one or more physical devices. An NMS, on the other hand, is a managing logic entity capable of managing one or more NEs via a network management protocol, for example, simple network management protocol ("SNMP").

In order to establish a high-speed computing network, NMS of a network is typically required to identify and/or initialize each and every attached NE via a network protocol such as a process of node discovery. When an NMS discovers one or more NEs, a large amount of data relating to the discovery information including various circuit data and node status need to be transferred from the NE to the NMS. For example, to obtain circuit data, NMS typically has to send large number of SNMP bulk requests, and subsequently, receives large number of independent responses back from each NE.

A problem associated with a conventional NMS is that a process of full node discovery is required when an NMS is restarted or recovered wherein a full node discovery is typically time consuming. Depending on the number of NEs attached, a full node discovery for a typical NMS can take hours to complete. High volume of request-response management transactions of a full node discovery can slow down and/or clog network management traffic, and consequently, degrade overall network performance.

SUMMARY

An apparatus and method improve the efficiency of data transfer utilizing partial node discovery during a system recovery. Upon retrieving a saved last sequence number associated with a network element ("NE") from a database in a network management system ("NMS"), a process of the partial node discovery obtains a current last sequence number associated with the NE from the NE. After identifying missing sequence numbers associated with the NE, sequence events associated with the NE in the database are updated in accordance with the missing sequence numbers.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
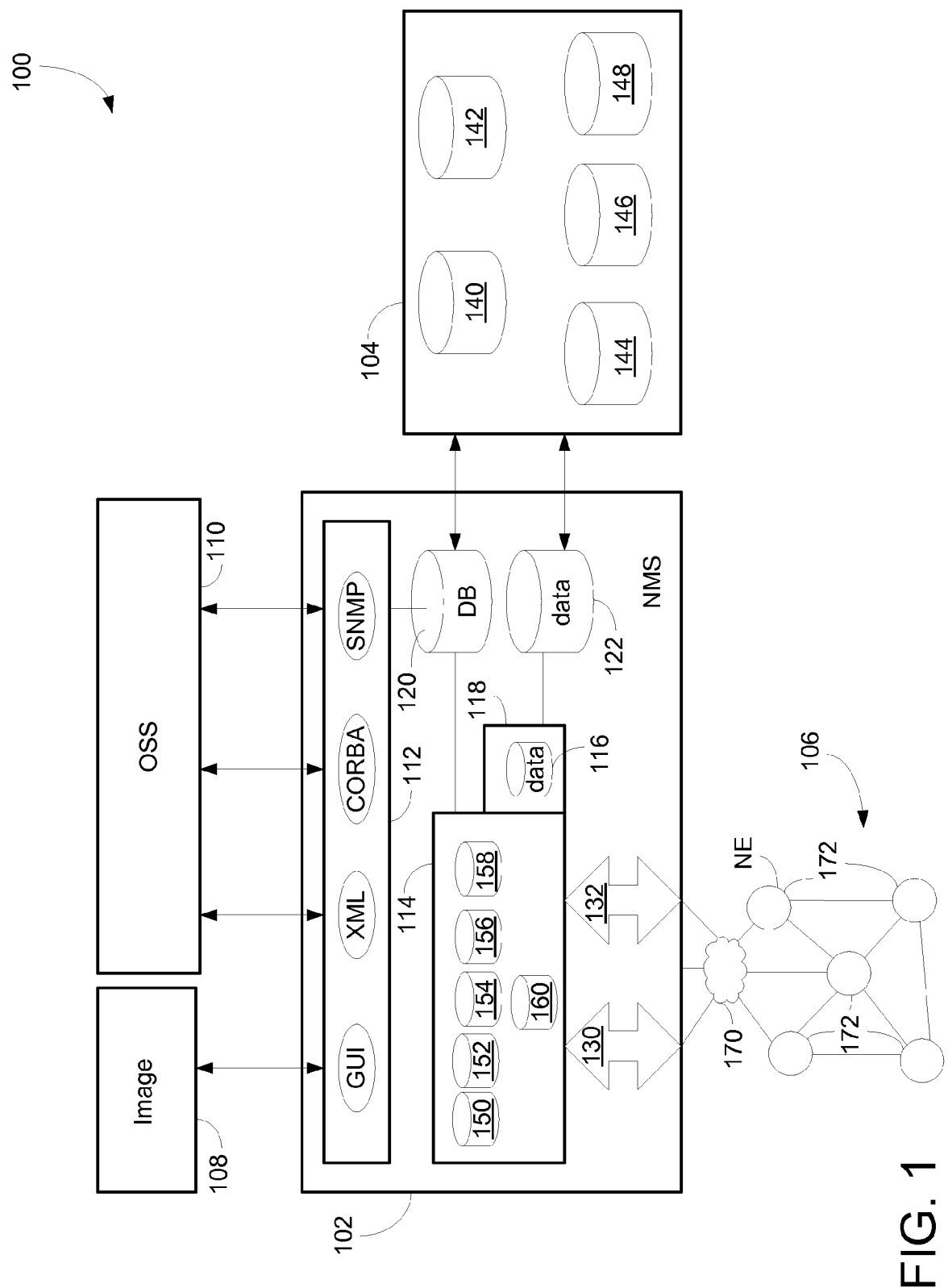
FIG. 1 is a block diagram illustrating a network architecture having a network management system ("NMS") and network elements ("NEs") in accordance with one embodiment of the present invention.

Exemplary embodiment(s) of the present invention is described herein in the context of a method, device, and apparatus of enhancing network performance using a partial node discovery during a system recovery.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. It, however, will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure unless otherwise defined.

As used herein, the singular forms of article "a", "an" and "the" are intended to include the plural forms as well, unless the context clearly indicates otherwise. Also, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items A process of partial node discovery can improve network efficiency of data transfer between a network management system ("NMS") and network elements ("NEs") during a system recovery. Upon retrieving a saved last sequence number associated with an NE from a database in an NMS, a process of the partial node discovery obtains a current last sequence number associated with the NE from the NE. After identifying missing sequence numbers associated with the NE, sequence events associated with the NE in the database are updated in accordance with the missing sequence numbers.

FIG. 1 is a block diagram 100 illustrating a network architecture including an NMS and NEs capable of implementing partial node discovery in accordance with one embodiment of the present invention. Diagram 100 includes an NMS 102, a client tool 104, NEs 106, and an operations support system ("OSS") 110. A graphic user interface ("GUI") block 108, which may be used to interact with a web manager or network administrator, can also be included in the network architecture. It should be noted that the underlying concept of the exemplary embodiment(s) of the present invention would not change if one or more blocks (or elements or links) were added to or removed from diagram 100.

NMS 102 further includes a server 114, a northbound interface ("NBI") 112, an NMS database ("DB") 120, a partial discovery module 118, data storage 122, and southbound interface ("SBI") 130-132. NMS 102 includes various hardware devices and software agents/modules to monitor and manage various attached NEs. The term "NMS" is also known as "element management system," "element management server," "network management station," "network management console," "network control system," "network manager," et cetera. Partial node discovery module 118, in one embodiment, includes a controller or agent capable of activating and managing the partial node discovery during NMS 102, for example, is in a recovery phase.

Server or NMS server 114, in one embodiment, includes a fault manager 150, a managed object module 152, a discovery manager 154, a configuration manager 156, a provisioning manager 158, and a security manager 160. While provisioning manager 158 facilitates network services such as circuit connections, security manager 160 provides network security including, but not limited to, user authentications. For example, server 114 is operable to interface with NEs 172 via SBI to collect FCAPS (Fault, Configuration, Accounting, Performance, and Security) information.

In one example, SBI is coupled to NEs 172 via a packet-based network 170 capable of facilitating network communications between NEs 172 and NMS 102. Depending on the nature of the data, some are retrieved during discovery time (like inventory data) and kept synchronized during the lifetime of the server. Other types of data are retrieved on-demand such as statistics. It should be noted that the concept of functionality relating to NMS 102 would not alter if server 114 is replaced by other types of digital processing system, such as a personal computer, a work station, a mainframe computer, a microcontroller, and the like.

NMS server 114 is also capable of interfacing with OSS 110 to facilitate monitoring capabilities, analyzing capacities, and/or billing purpose. For example, data can be forwarded between various components with different network control protocols and/or formats, such as simple network management protocol ("SNMP") or common object request broker architecture ("CORBA") for NBI. Alternatively, data can also be formatted in accordance with extensible markup language ("XML") for NBI.

NMS 102 also includes a data collection module ("DCM") 122 which runs as a separate application collecting performance and/or billing related data via server 114. The data is collected in files with the format of ASCII and/or binary and can be analyzed via Java™ API™. Data stored in DB 120 can be accessed by client, NBI, or APIs (Application Programming Interfaces). Report APIs is a set of Java™ API that can be used to query the database wherein the data output can be formed with various formats or files.

NBI 112, in one embodiment, includes a GUI component, an XML component, a CORBA component, and an SNMP component. While the GUI component provides GUI object model to a client or an administrator via block 108, the XML, CORBA, and SNMP components can communicate with OSS 110 independently. OSS 110, in one example, is capable of providing service management, flow-thru provisioning, customer network management, reporting, and/or OSS integration. The GUI component may include multiple modules, such as topology, services, equipment, performance, security, help, et cetera. For example, the GUI component provides various user interfaces such as viewing, statistic data, login, access management, and/or help page management.

Client tool 104 can be a third ($3^{rd}$) party tool including a traffic unit 140, a reporting unit 142, a billing unit 144, a data management 146, and a performance management 148. Client tool 104 coupled with NMS 102 is capable of obtaining various data from NMS 102 such as usage data and billing data and subsequently processing the data for various purposes. For example, billing unit 144 mediates the billing data and forwards the mediated billing data, for example, to reporting unit 142 for invoicing the end users.

During an operation, server 114 initiates a recovery signal after it is restarted from a disabled condition, partial node discover module 118 initiates a process of re-synchronizing the data between NEs and NMS. It should be noted that the recovery signal will be initiated if a full node discovery was successfully completed before server 114 went down. The partial node discover, which is also known as the Smart Discovery, reduces discovery time and resources to achieve the same result as synchronized data between the NE and the NMS. An advantage of using the Smart Discovery or partial node discovery is to reduce full node discoveries while the data between the NEs and NMS is still synchronized.

Figure 2:
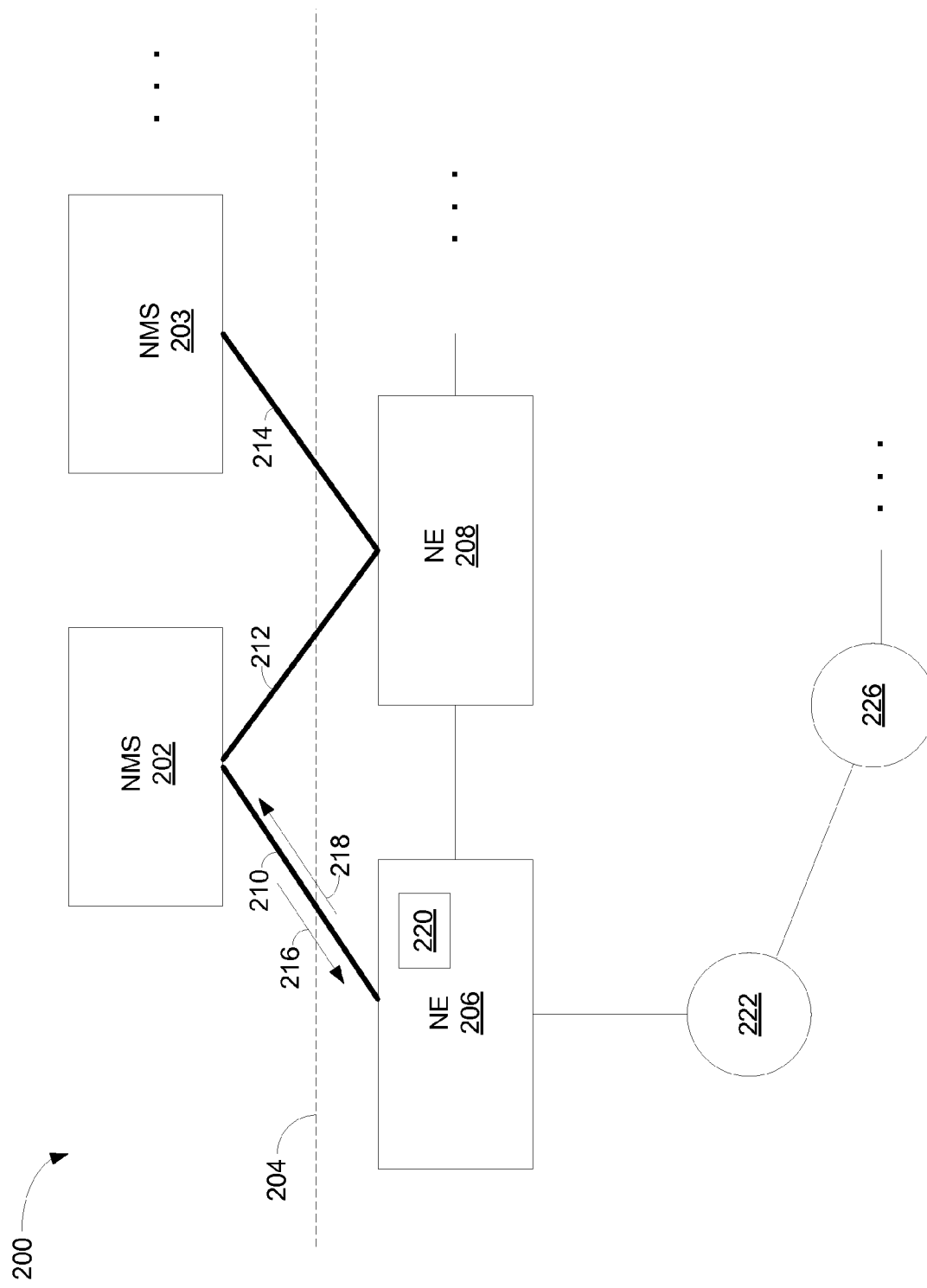
FIG. 2 is a block diagram illustrating a network configuration having NMSs and NEs in accordance with one embodiment of the present invention.

FIG. 2 is a block diagram illustrating a network interface between NMSs and NEs in accordance with one embodiment of the present invention. Diagram 200 includes NMSs 202-203 and a network environment 204 wherein network environment 204 further includes NEs 206-208, and nodes 222-226. A node, which can be one or more NEs, is an active electronic entity capable of sending, receiving, or forwarding information over a communications channel or a link. Links or connections 210-214 are employed to couple NMSs 202-203 with NEs 206-208. It should be noted that the underlying concept of the exemplary embodiment(s) of the present invention would not change if one or more blocks (or elements or links) were added to or removed from diagram 200.

NEs 206-208, also known as managed devices, are hardware devices which may include routers, connections, switches, bridges, computers, terminal servers, and/or a combination of routers, connections, switches, bridges, computers, and/or terminal servers connected in network environment 204. While each NE may be connected to its neighboring NE(s), the NE is generally connected to at least one NMS. For example, NE 208 is coupled to both NMSs 202-203 via links 212-214 and may be managed by one or both NMSs. The NE can also be considered as a facility or equipment used to facilitate provisioning of telecommunications services. In one example, an NE further includes an agent 220 which can be a software module(s) responsible for network management transactions.

NMS 202 is a computer, workstation, a server, and/or a cluster of computers capable of executing various network management applications. Various NEs and nodes are constantly being managed and monitored by a NMS(s) in a managed network environment. In each managed environment, at least one NMS should be present. Depending on the applications, multiple NMSs may be used to manage and/or monitor one or more NEs in a network. A network can either be a circuit-based network or a packet-based network.

NMSs 202-203 are coupled with NEs 206-208 via links 210-214 wherein links 210-214 can be wires, cables, coax connections, wireless connections, and the like. For example, NMS 202 may issue a message 216 using a management protocol. NE 206, subsequently, sends a response 218 to reply to message 216. The network protocol can be the Simple Network Management Protocol ("SNMP"). It should be noted that depending on the applications, a different type of network protocol may be used in place of SNMP.

SNMP is a network managing and surveillance protocol used in network management systems for monitoring NEs and/or network devices attached to the network environment. For example, SNMP includes an application layer protocol which is able to process management data to control various managed systems or NEs. NMS employs SNMP to manage a number of attached NEs and/or managed systems. Each attached NE or managed system is configured to report status and/or information to and from at least one managing system or NMS.

For a circuit switching network, a link or a channel can be established between multiple nodes and/or terminals to facilitate network communication. It should be noted that a link or a circuit or a channel acts as an electrical circuit physically connecting two nodes, two NEs, or two network devices. For example, during a network discovery process, every NE as well as network circuit needs to be discovered and/or initialized by NMS or NMSs before each NE can access the network. Network discovery process can take time and resources for each NMS to complete a network configuration and/or a network discovery process. In another example, a network element discovery may be required when a primary router switches over to a backup router or vice verse.

During an operation of partial node discovery, NMS 202, for instance, issues a get-message 216 of missing sequence number(s) ("SN") to NE 206 via connection 210 and NE 206 subsequently sends a reply-message 218 carrying the missing SN to NMS 202 via connection 210.

An advantage of using partial node discovery is to reduce full node discoveries for system recoveries whereby the overall network performance can be improved. Note that the system recovery indicates a system or server or NMS is restarted after it is disabled or down. It should be further noted that in order for the partial node discovery to be effective, the NMS should complete its full node discovery before it is disabled. Since the NMS persists the information and/or data obtained during the previous full node discovery, the NMS only needs to reload missing information (or sequence events) from NEs after it is restarted.

Figure 3:
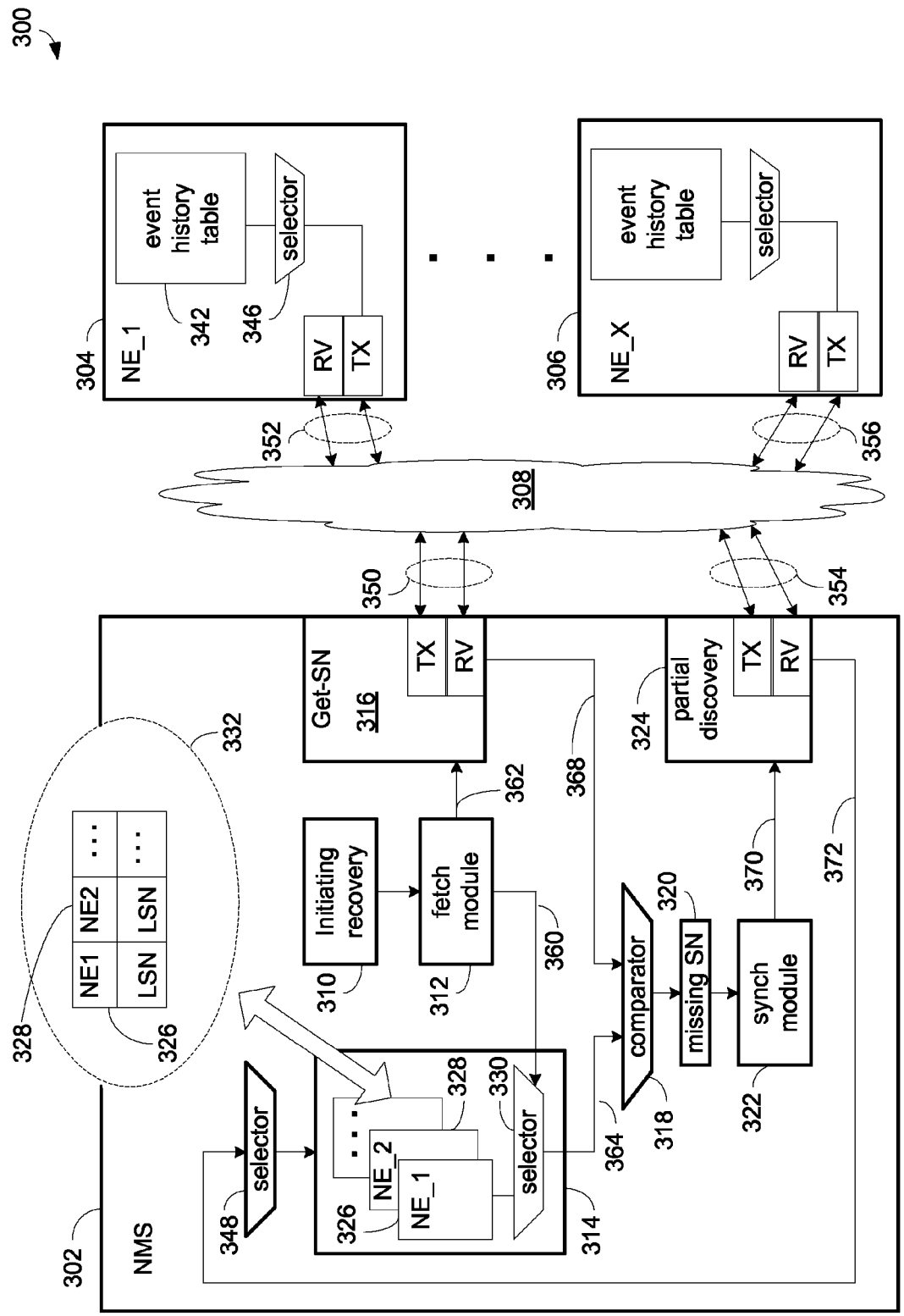
FIG. 3 is a logic diagram illustrating an exemplary data flow during a process of a partial node discovery in accordance with one embodiment of the present invention.

FIG. 3 is a logic diagram 300 illustrating an exemplary data flow during a process of partial node discovery in accordance with one embodiment of the present invention. Diagram 300 includes an NMS 302, a network 308, and NEs 304-306, wherein NEs 304-306 are coupled to NMS 302 via connections 350-356. Network 308 can be a circuit switching network, Internet, or a combination of circuit switching network and Internet. It should be noted that the underlying concept of the exemplary embodiment(s) of the present invention would not change if one or more blocks (or elements or links) were added to or removed from diagram 300.

NMS 302 further includes an initiating recovery module 310, a fetch module 312, a database 314, a comparator 318, and a synch module 322. In one embodiment, NMS 302 includes a get-SN module 316 and a partial discovery module 324, wherein get-SN module 316 and partial discovery module 324 can be integrated into the same device. In one embodiment, get-SN module 316 and partial discovery module 324 includes transmitters ("TXs") and receivers ("RVs"). Note that TXs and RVs are used to transmit and/or receive information between NMS 302 and NEs 304-306.

Database 314 is a storage location containing various NE related objects 326-328 and a selector 330. For example, object 328 records a last sequence number ("LSN") associated to NE_1 304 and object 326 stores a LSN relating to NE_2, not shown in FIG. 3. Dotted-circle 332 pointed by an arrow is an exemplary storage layout storing various objects 326-328. In one embodiment, database 314 saves LSNs for all attached and/or connected network devices or NEs. In one example, a management server or NMS maintains the last sequence number from each NE. During sync-up time, NMS compares the last sequence number read from the NE and the last sequence number stored in the management system to determine whether subsequent event(s) has occurred. It should be noted that database 314 can include additional information.

NE 304 includes an event history table 342, a selector 346, and a pair of TX and RV, wherein the TX and RV are used to communicate between NMS 302 and NE 304. Event history table 342 records a sequence of events or alarms used to track events over a period of time. Event, for example, includes node creations, logins, circuit creations, enabling, disabling, and the like. Depending on the applications, event history table 342 could have thousands entries and it is being continuously updated. In one embodiment, event history table 342 is dynamically and instantaneously updated as soon as an event occurs. Alternatively, event history table 342 is updated on a periodic fixed time frame. It should be noted that while an NMS is disabled or down, some attached NEs continue to operate and continue to update its event history table.

During an NMS recovery process or sync-up (or re-synchronizing) time, partial node discovery module 324 is able to synchronize the data between NMS and NEs by loading the missing sequence events instead of reloading the entire event history table. Since database 314 persists the LSNs for attached NEs, loading the missing sequence events from event history tables 342 of NEs can improve loading efficiency. Transferring a few hundreds event entries instead of transferring a few thousand event entries for every NE or node can enhance overall network performance. Upon detecting the missing sequence number, NMS or management system processes each missing number one at a time until the event status are synchronized. For example, when the management system sends a resent trap (identified by sequence #) request to NE, NE subsequently sends the trap requested to the management system. Depending on the content of an event, the trap is processed by, for example, updating corresponding data, discarding the event, and so on.

Initiating recovery module 310, in one embodiment, receives a restart or recovery signal from a processor, not shown in FIG. 3. Upon verifying that a full node discovery has been completed before NMS 302 is disabled, initiating recovery module 310 generates a re-synchronizing signal and forwards the re-synchronizing signal to fetch module 312. After acknowledging the re-synchronizing signal, fetch module 312 generates a load command and a fetch command, wherein the fetch command obtains the saved last sequence number ("LSN") from object 328 of database 314 for NE_1 via connection 360. The load command loads the current LSN from event history table 342 from NE_1 304 via connections 362 and 350. Get-SN 316 sends a get-message requesting the current LSN to NE_1 304 via TX and subsequently receives reply message carrying the current LSN from NE1 304 via RV. Note that the current LSN is also known as the last-send event sequence number and it indicates the latest event occurred for the particular NE.

Upon arrival of the current LSN from connection 368 and the saved LSN from selector 330 of database 314 via connection 364, comparator 318 subtracts or compares the current LSN with the saved LSN and generates a missing SN 320. Synch module 322 analyzes missing SN 320 and activates partial node discovery process. During the recovery process, partial discovery module 324 is capable of loading single missing event or multiple missing sequence events from NE1 304 via network 308. Upon receipt of the missing sequence events via RV of partial discovery module 324, object 328, for example, is updated in view of the missing sequence events through selector 348 via connection 372. It should be noted that NMS 302 is capable of conducting multiple partial node discoveries simultaneously to obtain missing sequence events from multiple NEs.

In one embodiment, a network system includes an NE and an NMS, wherein the NE stores each sequence number and/or event indicating network activities in an event history table. During a process of partial node discovery, comparator module 318 compares a saved last sequence number and a current last sequence number. The synchronizing module subsequently synchronizes the sequence numbers in the database of the NMS in response to the result of comparison.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 4:
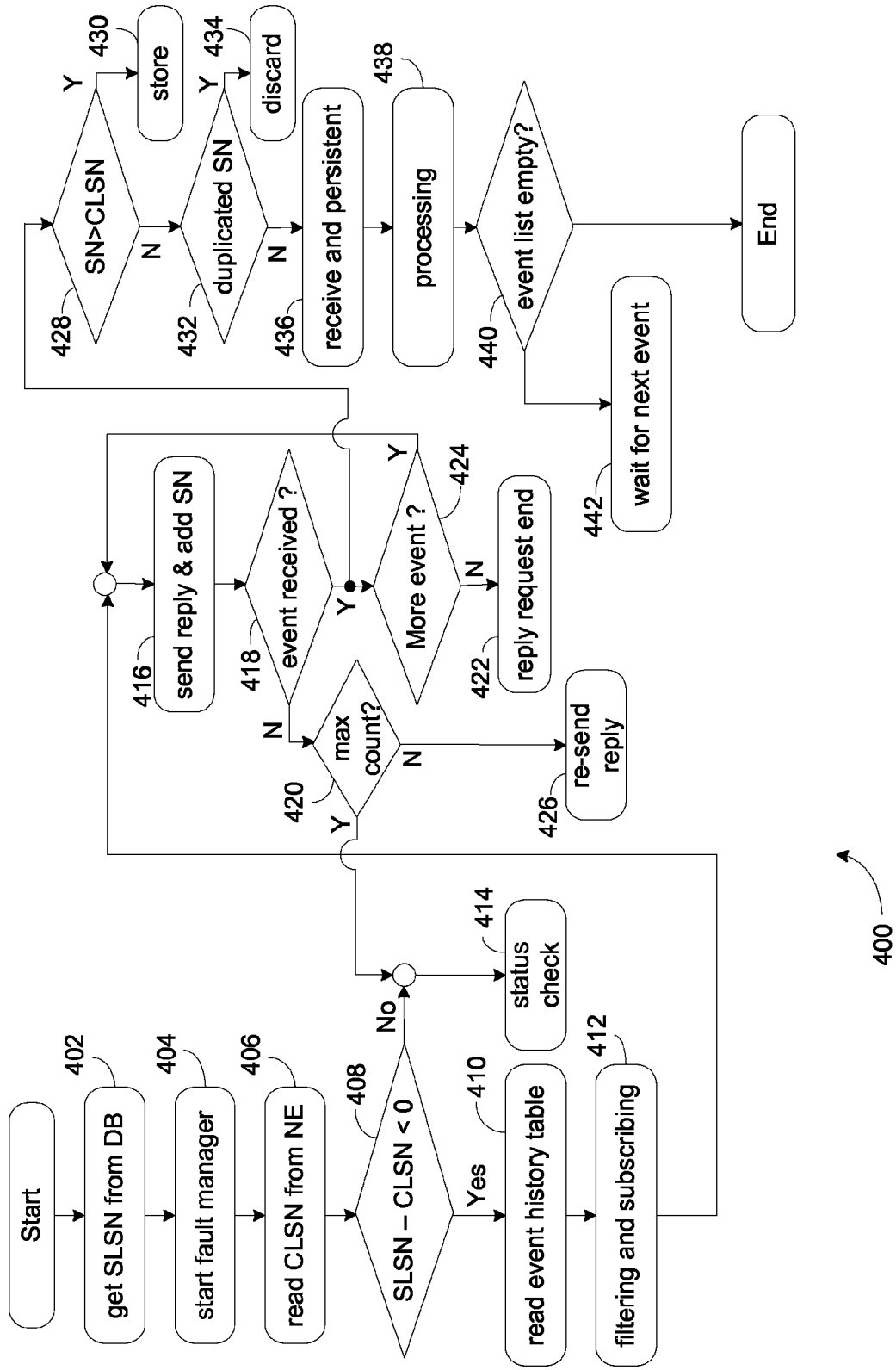
FIG. 4 is a flowchart illustrating a process of system recovery including a partial node discovery in accordance with one embodiment of the present invention.

FIG. 4 is a flowchart 400 illustrating a process of system recovery including a partial node discovery in accordance with one embodiment of the present invention. At block 402, the process obtains a saved last sequence number ("SLSN") from a local database in an NMS. SLSN is also known as last saved sequence number or last received sequence number. In one embodiment, the process also verifies the completion of previous full node discovery before NMS is disabled. If SLSN is greater than zero, the process proceeds to the next block. Otherwise, a full node discovery may be introduced.

At block 404, in addition to activate a fault manager, registering a trap client and discovering active alarms are also performed and processed. After reading the current last sequence number ("CLSN"), which is also known as last-send event sequence number from an NE at block 406, comparator compares SLSN and CLSN at block 408. If SLSN minus CLSN is equal or greater than zero, the process proceeds to activate a status check at block 414 because the node or NE could have been rebooted. Note that if a node or NE is rebooted during the recovery period, full node discovery for the node may be necessary. If, however, SLSN minus CLSN is less than zero, the process moves to block 410.

At block 410, the process reads the entries of the event history table from the NE using SLSN as index to synchronize the data or events between NMS and NE(s). After filtering and subscribing event parameters or indications at block 412, the process sends a reply message for the next event request while the SN is added to an event list at block 416.

At block 418, the process checks periodically to determine whether an event has arrived or received. If the event has not been received, maximum retry count is examined at block 420. If the maximum retry count is reached, a full node discovery is activated at block 414. Otherwise, reply message for the next event request is resent at block 426.

Once an event is received, the process loops back to block 416 if more event(s) to reply message is expected at block 424. Otherwise, the reply message request is finished at block 422. At block 428, the process evaluates the sequence number against last-send event sequence number from NE. The event is stored at block 430 if the sequence number is greater than last-send event sequence number.

The sequence number and/or event are discarded at block 434, if the sequence number is a duplicated sequence number at block 432. Otherwise, the sequence event is marked, received, and the information relating to the sequence event is persistent in an event table at block 436. After processing the event at block 438, the process waits for the next event at block 442 if the event list is not empty. If the event list is empty at block 440, the process ends.

Figure 5:
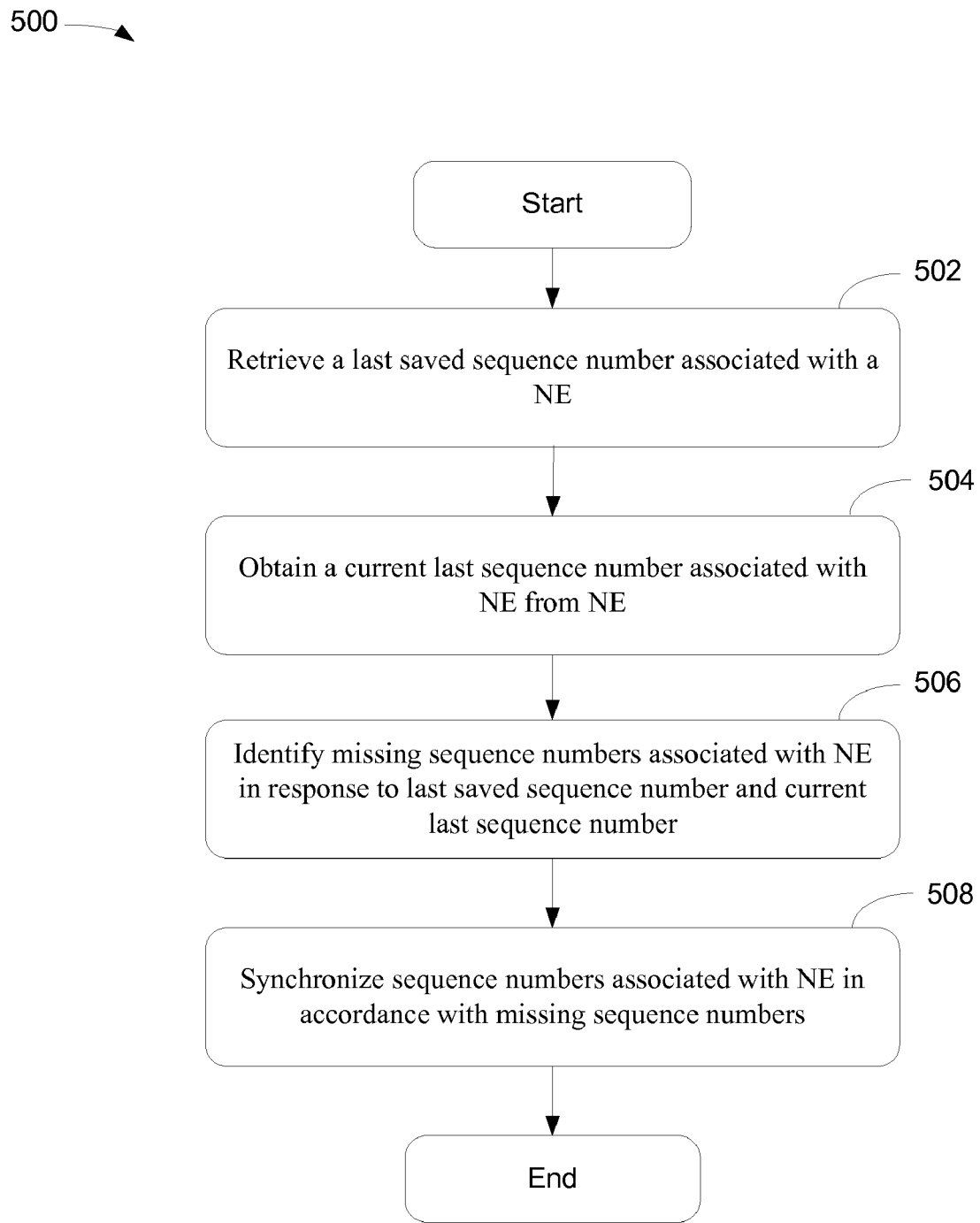
FIG. 5 is a flowchart illustrating a process of a partial node discovery for a network management communication in accordance with one embodiment of the present invention.

FIG. 5 is a flowchart 500 illustrating a process of partial node discovery for a network management communication in accordance with one embodiment of the present invention. At block 502, a process of partial node discovery retrieves a saved last sequence number associated with a first NE from a database in an NMS. In one embodiment, upon verifying a completion of full node discovery for the NMS before it is disabled, the process detects recovery activities of the NMS and subsequently issues a re-synchronizing signal initiating a partial node discovery. The process is capable of fetching the saved last sequence number from a local database in the NMS.

At block 504, a current last sequence number associated with the first NE is obtained from the first NE. The process, for instance, is capable of issuing a network command indicating to get a last sequence number associated with the first NE from the first NE at the present time. Upon reading the last-send event sequence number from an entry of the event history table at the first NE, the process forwards the last-send event sequence number from the first NE to the NMS.

At block 506, the process identifies the missing sequence numbers associated with the first NE in response to the saved last sequence number and the current last sequence number. For example, upon comparing the saved last sequence number with the current last sequence number, the process determines a difference between the saved last sequence number and the current last sequence number, wherein the difference is the missing sequence events.

At block 508, sequence numbers associated with the first NE in the database is synchronized in accordance with the missing sequence numbers. Upon obtaining the missing sequence numbers from the first NE to the NMS, the process loads the missing sequence events from the first NE to the NMS in bulk at a time. In one embodiment, after retrieving a saved last sequence number associated with a second NE from the database in a NMS, the process obtains a current last sequence number associated with the second NE from the second NE. Once the missing sequence numbers associated with the second NE is identified in response to the saved last sequence number and the current last sequence number, the process synchronizes sequence numbers associated with the second NE in the database in accordance with the missing sequence numbers.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for network recovery, comprising:
verifying completion of full node discovery;
detecting recovery activities of a network management system ("NMS");
issuing a re-synchronizing signal indicating a partial node discovery;
retrieving a saved last sequence number associated with a first network element ("NE") from a database in the NMS;
obtaining a current last sequence number associated with the first NE from the first NE;
identifying missing sequence numbers associated with the first NE in response to the saved last sequence number and the current last sequence number; and
synchronizing event status associated with the first NE in accordance with the missing sequence numbers.

2. The method of claim 1, wherein retrieving a saved last sequence number associated with a first NE from a database in an NMS includes fetching the saved last sequence number from a local database in the NMS.

3. The method of claim 1, wherein obtaining a current last sequence number associated with the first NE from the first NE includes issuing a network command indicating to get a last sequence number associated with the first NE from the first NE at present time.

4. The method of claim 3, wherein issuing a network command indicating to get a last sequence number associated with the first NE from the first NE further includes,
reading a last-send event sequence number from an entry of event history table at the first NE; and
forwarding the last-send event sequence number from the first NE to the NMS.

5. The method of claim 1, wherein identifying missing sequence numbers associated with the first NE includes:
comparing the saved last sequence number with the current last sequence number; and
determining a difference between the saved last sequence number and the current last sequence number.

6. The method of claim 1, wherein synchronizing event status associated with the first NE in accordance with the missing sequence numbers includes:
obtaining the missing sequence numbers from the first NE to the NMS one at a time and;
processing each event in accordance with each of the missing sequence numbers.

7. The method of claim 1, wherein synchronizing event status associated with the first NE in accordance with the missing sequence numbers includes obtaining the missing sequence numbers from the first NE to the NMS in bulk at a time.

8. The method of claim 1, further comprising:
retrieving a saved last sequence number associated with a second NE from the database in a NMS;
obtaining a current last sequence number associated with the second NE from the second NE;
identifying missing sequence numbers associated with the second NE in response to the saved last sequence number and the current last sequence number; and
synchronizing sequence numbers associated with the second NE in the database in accordance with the missing sequence numbers.

9. A network system, comprising:
a first network element ("NE") capable of storing each sequence number indicating network activities in a first event history table;
a NMS coupled to the first NE via a connection and capable of verifying completion of full node discovery and detecting a recovery activity, wherein the NMV able to issue a re-synchronizing signal for performing a partial node discovery includes,
a comparator module configured to compare a saved last sequence number associated with the first NE and a current last sequence number from the first NE; and
a synchronizing module coupled to comparator module and configured to synchronize sequence numbers associated with the first NE in a database in the NMS in response to a result of comparison from the comparator module.

10. The system of claim 9, further comprising a second NE coupled to the NMS and capable of storing each sequence number indicating network activities in a second event history table, wherein,
the comparator module configured to compare a saved last sequence number associated with the second NE and a current last sequence number from the second NE; and
the synchronizing module coupled to comparator module and configured to synchronize sequence numbers associated with the second NE in a database in the NMS in response to a result of comparison from the comparator module.

11. The system of claim 10, wherein the NMS is capable of initiating partial node discoveries for the first NE and the second NE at substantially same time.

12. The system of claim 9, wherein the NMS further includes a loading module capable of retrieving the saved last sequence number associated with the first NE from the database in the NMS.

13. The system of claim 12, wherein the NMS further includes a fetch module capable of obtaining the current last sequence number associated with the first NE from the first NE via the connection.

14. The system of claim 13, wherein the NMS further includes a calculator module capable of identifying missing sequence numbers associated with the first NE in response to comparison between the saved last sequence number and the current last sequence number.

15. A method for obtaining network information, comprising:
  verifying completion of full node discovery;
  detecting recovery activities of a network management system ("NMS");
  issuing a re-synchronizing signal indicating a partial node discovery;
  retrieving a saved last sequence number of a first network element ("NE") from a database in the NMS;
  obtaining a last-send event sequence number from an event history table in the first NE via a first connection; and
  loading sequence events between the saved last sequence number and the last-send event sequence number from the event history table to the database.

16. The method of claim 15, further comprising:
  synchronizing event status associated with the first NE in accordance with missing sequence numbers.

17. The method of claim 16, further comprising:
  retrieving a saved last sequence number of a second NE from a database in the NMS;
  obtaining a last-send event sequence number from an event history table in the second NE via a first connection; and
  loading sequence events between the saved last sequence number and the last-send event sequence number from the event history table for processing event and synchronizing the database.

18. The method of claim 15, further comprising performing a process of a full node discovery when the saved last sequence number of the first NE is equal to zero.

19. The method of claim 18, wherein loading sequence events between the saved last sequence number and the last-send event sequence number from the event history table to the NMS further includes reading a plurality of entries from the event history table in accordance with the saved last sequence number and the last-send event sequence number.

* * * * *